(12) United States Patent
Sen et al.

(10) Patent No.: US 6,608,558 B2
(45) Date of Patent: Aug. 19, 2003

(54) DAMPER DEVICE FOR BUILDING, AND MONITOR AND CONTROL SYSTEM FOR DAMPER DEVICE

(75) Inventors: Shii Sen, Tokyo (JP); Yuji Kotake, Tokyo (JP); Toshikazu Yamada, Tokyo (JP); Haruhiko Kurino, Tokyo (JP)

(73) Assignee: Hitachi Kizai, Inc., Tokyo (JP)

( * ) Notice: Subject to any disclaimer, the term of this patent is extended or adjusted under 35 U.S.C. 154(b) by 0 days.

(21) Appl. No.: 09/778,399

(22) Filed: Jun. 5, 2001

(65) Prior Publication Data

US 2001/0030609 A1 Oct. 18, 2001

(30) Foreign Application Priority Data

Feb. 4, 2000 (JP) ........................................ 2000-027969

(51) Int. Cl.[7] ................................................. G08B 1/00
(52) U.S. Cl. ...................... 340/531; 340/544; 340/679; 340/665; 340/666; 340/678
(58) Field of Search ............................... 340/531, 532, 340/533, 540, 544, 679, 665, 666, 671, 678

(56) References Cited

U.S. PATENT DOCUMENTS

| | | | | |
|---|---|---|---|---|
| 4,841,685 A | * | 6/1989 | Masri et al. .................. 52/167 |
| 5,036,633 A | * | 8/1991 | Kobori et al. ................. 52/167 |
| 5,046,290 A | * | 9/1991 | Ishit et al. .................... 52/167 |
| 5,163,256 A | * | 11/1992 | Fukumoto et al. ............ 52/573 |
| 5,168,967 A | * | 12/1992 | Abiru et al. .................. 188/378 |
| 5,193,323 A | * | 3/1993 | Ishii et al. .................... 52/167 |
| 5,421,129 A | * | 6/1995 | Sakamoto et al. ........... 52/167.2 |
| 5,576,971 A | * | 11/1996 | Ishii et al. .................... 364/505 |
| 5,979,126 A | * | 11/1999 | Kurino et al. ............... 52/167.2 |
| 6,224,481 B1 | * | 5/2001 | McCabe ....................... 454/369 |

* cited by examiner

Primary Examiner—Daniel J. Wu
Assistant Examiner—Daniel Previl
(74) Attorney, Agent, or Firm—Muramatsu & Associates

(57) ABSTRACT

An oil pressure damper device for an architectural structure and a monitor and control system of the damper device without requiring an exclusive network for connecting between the damper devices and the monitor and control system, and is able to monitor operations without regard to the distance between the damper devices and the monitor system. The oil pressure damper device includes a detection unit for detecting conditions of the damper device, a communication unit for transmitting information detected by the detection unit through a public communication network and/or a local area network, and a monitor for receiving the information from the communication unit and monitoring the conditions of the damper devices of the architectural structure.

8 Claims, 7 Drawing Sheets

DAMPER DEVICE FOR BUILDING, AND MONITOR AND CONTROL SYSTEM FOR DAMPER DEVICE

FIELD OF THE INVENTION

The present invention relates to a shock or vibration damper device for building, such as an oil pressure damper, and to a monitor system and a control system of the shock damper devices for buildings.

BACKGROUND OF THE INVENTION

Traditionally, to reduce an external force applied to an architectural structure (building), such as an earthquake, from deforming the building, seismic oil pressure dampers 14 (shock or vibration damper devices for a building) are installed in the building such as shown in FIGS. 5 and 6. FIG. 5 shows the configuration of building 1 which includes columns 3, beams 5, as well as V-shaped braces (intersecting braces) 7.

Under the braces 7, seismic damping structures 10 are provided between the braces 7 and the beams 5 (or floor 8). More particularly, as shown in FIG. 6, a fixed block 12 is integrally provided at each end of the beam 5, and a seismic oil pressure damper 14 is installed between the fixed block 12 and a bottom end 7a of the V-shaped brace 7.

In the seismic oil pressure damper 14, a temperature sensor that detect the oil temperature is provided close to a valve installed en route of an oil path running between a pair of oil chambers. For example, as shown in FIG. 6, two seismic oil pressure dampers 14 are installed per every structural level of the building. Therefore, as shown in FIG. 5, in the case where each pair of seismic damping structures 10 is installed on each and every five structural levels, a total of ten temperature sensors are established in the structure.

As shown in FIG. 7, the temperature sensors 25A–25J are connected to a computer based controller 35. Further, a memory 37, a control board 39 such as a key board, and a display screen 41 such as a CRT (Cathode Ray Tube) or LCD (Liquid Crystal Display) panel are also connected to the controller 35. Al of the controller 35, memory 37, control board 39, and display screen 41 are collectively installed in one area, a control room for example, in the building 1.

An operational procedure of a monitor system of the seismic oil pressure dampers 14 in the conventional technology above is explained in the following.

When an external force, such as an earthquake is applied in such a way to deform the building 1, each seismic oil pressure damper 14 will operate either in a compression or decompression manner in response to the deformation of the building.

At this time, the hydraulic fluid in the pair of oil chambers flows from the one oil chamber to the other oil chamber. During this oil flow, the temperature of the oil will rise due to the resistance produced by a narrowed portion of the valve between the oil chambers. Such temperature increase is detected by the temperature sensors 25A–25J and each measured temperature data is sent to the controller 35. The controller 35 controls the memory 37 to store the measured temperature data therein.

After the external force, such as an earthquake, has settled down, an operator will operate the control board 39, which will allow the controller 35 to read the measured temperature data received from each and every temperature sensor 25A–25J stored in the memory 37, and display the data on the display screen 41. When the operator sees the data on the display screen 41, he/she will examine whether the measured temperature values from all of the temperature sensors 25A–25J are about the same.

If the detected temperature from some of the temperature sensors show measured values which are significantly different from that of many other temperature sensors, the operator may speculate a possible fault in the seismic oil pressure damper 14 related to that temperature sensor. In such a case, it is possible to quickly inspect and repair the speculated seismic oil pressure damper 14, replace the seismic oil pressure damper so as to function properly, thereby maintaining the monitor system.

However, in such a conventional monitor system of the shock damper devices, an exclusive network is required to connect between the controller 35, which is provided in the control room in the building 1, and the temperature sensors 25A–25J, which are structured in the seismic oil pressure dampers 14 provided at each architectural level of the building. As a result, the conventional technology involves problems in that it requires materials and components for establishing the dedicated communication network and construction labor for building such network, resulting in the cost increase in material and labor.

This problem is particularly true when the distance between the controller 35 in the building 1 and the seismic oil pressure dampers 14 at each architectural level becomes longer. Such a problem may be alleviated if the seismic oil pressure dampers 14 and the control room having the controller 35 are installed within the same building. However, if they are installed in separate architectural structures, or if the distance between them becomes longer, then the connection by the exclusive network becomes practically impossible.

In addition, even though such connections between the buildings are possible, the longer the distance between the architectural structures becomes, the more decrease in the signal levels such as voltages of signals transmitted through the exclusive network due to the resistance in the network. Because the signal levels are decreased through the consumption by the resistor in the network, it becomes practically impossible to achieve the intended purpose of monitoring the damper devices.

SUMMARY OF THE INVENTION

Therefore, in view of the above mentioned problems, it is an object of the present invention to provide damper devices for an architectural structure with a monitor and control system which does not require an exclusive network for connecting between the damper devices and the monitor and control means, and which is able to conduct monitoring and controlling operations without regard to the distance between the damper devices and the monitor and control means.

It is another object of the present invention to provide a shock damper device with a monitor and control system for an architectural structure which does not require a special communication network between the damper devices and the monitor and control means, thereby making the materials and construction labor for establishing the dedicated communication network unnecessary, resulting in a dramatic reduction in the material and labor cost.

In order to solve the above problems, the shock damper devices of the present invention for architectural structure is comprised of: a detection means for detecting functional conditions of the damper device of the architectural structure, a communication means for transmitting information detected by the detection means through a public communication network and/or a local area network, and a monitor and control means for receiving the information transmitted through the communication means and monitoring the functional conditions of the damper devices of the architectural structure.

According to the configuration of the shock damper device of the architecture structure, the detection means detects the functional conditions of the damper devices of the architectural structure, the communication means sends the detected signal from the detection means to the monitor and control means by using the public communication network and/or local area network, and the monitor and control means receives the detected signals from the detection means and monitors the functional conditions of the damper devices of the architectural structure. Because of this configuration, in the present invention, the dedicated network for connecting the damper device and the monitoring and controlling system used in the conventional technology is no longer necessary. Therefore, the operation of the monitor and control means can be proceeded without regard to the distance between the damper devices and the monitor and control system.

DETAILED DESCRIPTION OF THE EMBODIMENTS

Based on the drawings, the embodiments of the present invention will be explained in detail below.

Figure 1:
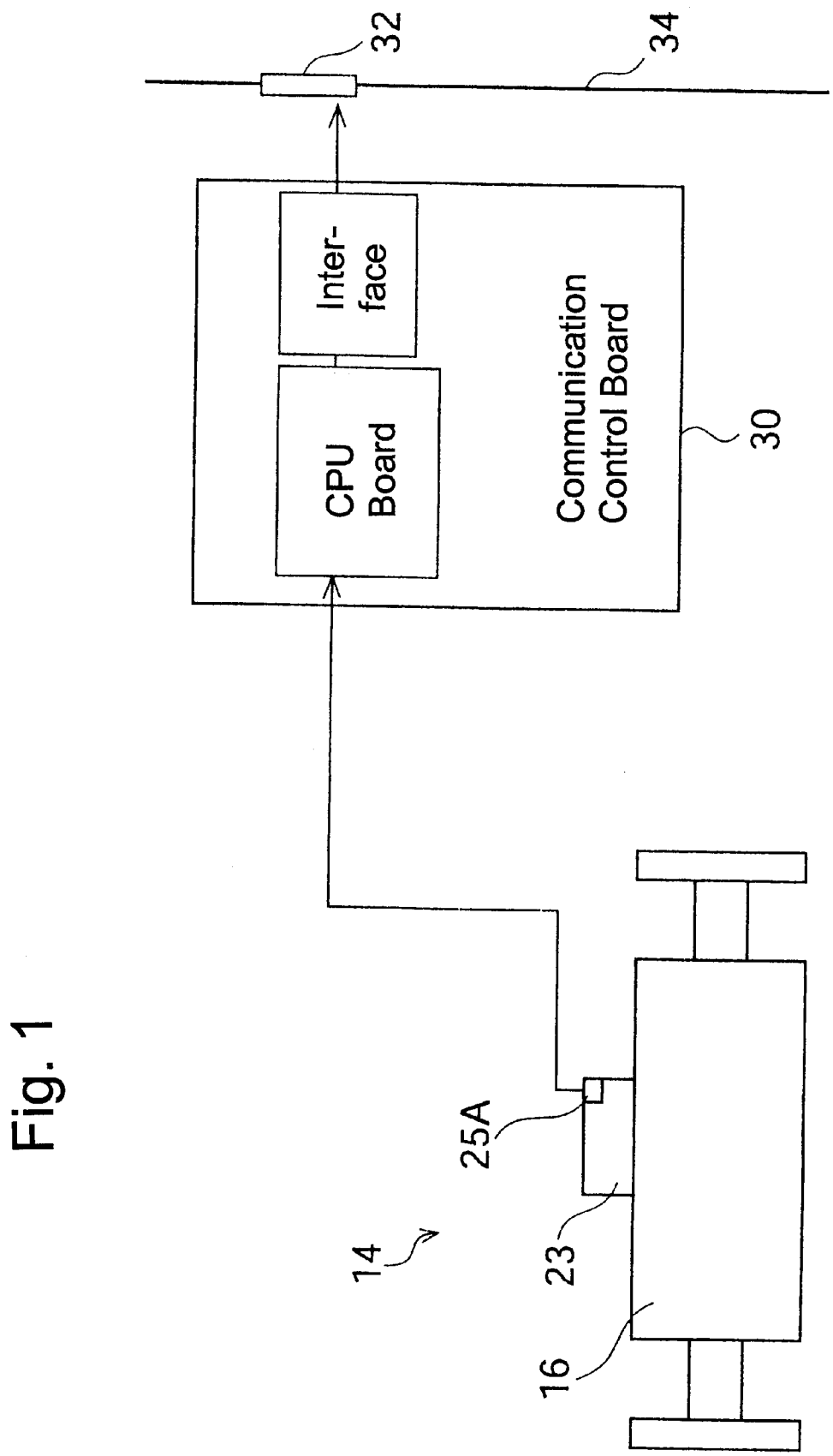
FIG. 1 is a circuit diagram showing the essential portion of the shock damper device with the monitor and control system for the architectural structure in the first embodiment of the present invention.
Figure 2:
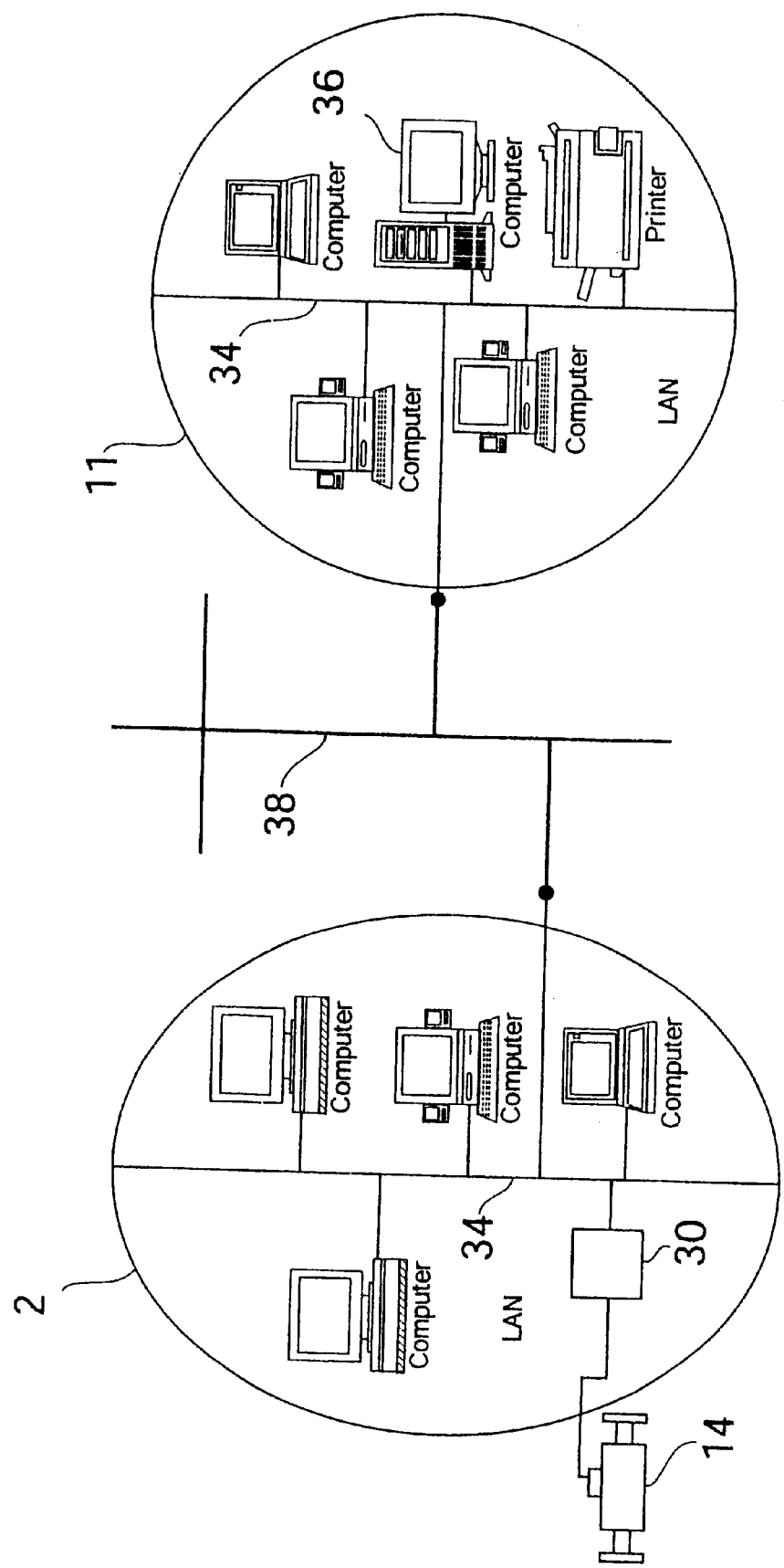
FIG. 2 is a circuit diagram showing an overall structure of the shock damper device with the monitor and control system for the architectural structure in the first embodiment of the present invention.

FIGS. 1 and 2 are drawings incorporated to describe the first embodiment of the shock damper device for an architectural structure (building) and the monitor and control system of the damper device in the present invention.

In FIG. 1, detection signal from a temperature sensor 25A (detection means) of seismic oil pressure damper 14 (damper device for building) similar to the conventional one is sent to a LAN (Local Area Network) circuit 34 (communication network) provided in a building 2 (FIG. 2) as a digital signal through a communication control board 30 with computer functions (communication means) and a hub 32. Other temperature sensors of the seismic oil pressure dampers 14 on each level of the building 2 are also connected in the same manner, where the detection signals are sent to the LAN circuit 34 through the communication control board 30 and the hub 32.

Then, as shown in FIG. 2, LAN circuit 34 in the building 2 is connected to a terminal of a public communication network 38, such as an ISDN circuit external to the building 2, and other terminal of the public communication network 38 is connected to LAN circuit 34 in a separate architectural structure (building) 11, which is far away from the building 2.

The LAN circuit 34 in the building 11 is connected to a plurality of personal computers 36, and one of them (or several of them) is used as monitor and control means (controller or receiver means) of the seismic oil pressure dampers 14. The operational procedure of the monitor and control system for the seismic oil pressure dampers 14 is described in the following.

First, as shown in FIG. 1, temperature sensor 25A detects the functional conditions related to the oil temperature in the seismic oil pressure damper 14, and the detected signal is then sent to the CPU board of the communication control board 30.

The communication control board 30 has a computer function, and sends the detected signal to the public communication network 38 as a digital signal through LAN circuit 34. By using, for example, the internet function of the communication control board 30, it can establish a computer communication network with the LAN circuit 34 in the building 2 and the public communication network 38, thereby establishing communication with the LAN circuit 34 in the building 11. Further, the connection with the computer communication network by the communication control board 30 is always maintained all day long, 24 hours a day.

The personal computer 36 used as the monitor and control means for the seismic oil pressure dampers 14 connected to LAN circuit 34 in the building 11 can also communicate with the communication control board 30 in the building 2 noted above with use of the internet function. Such connection with the computer communication network is maintained all day long, 24 hours a day.

Figure 7:
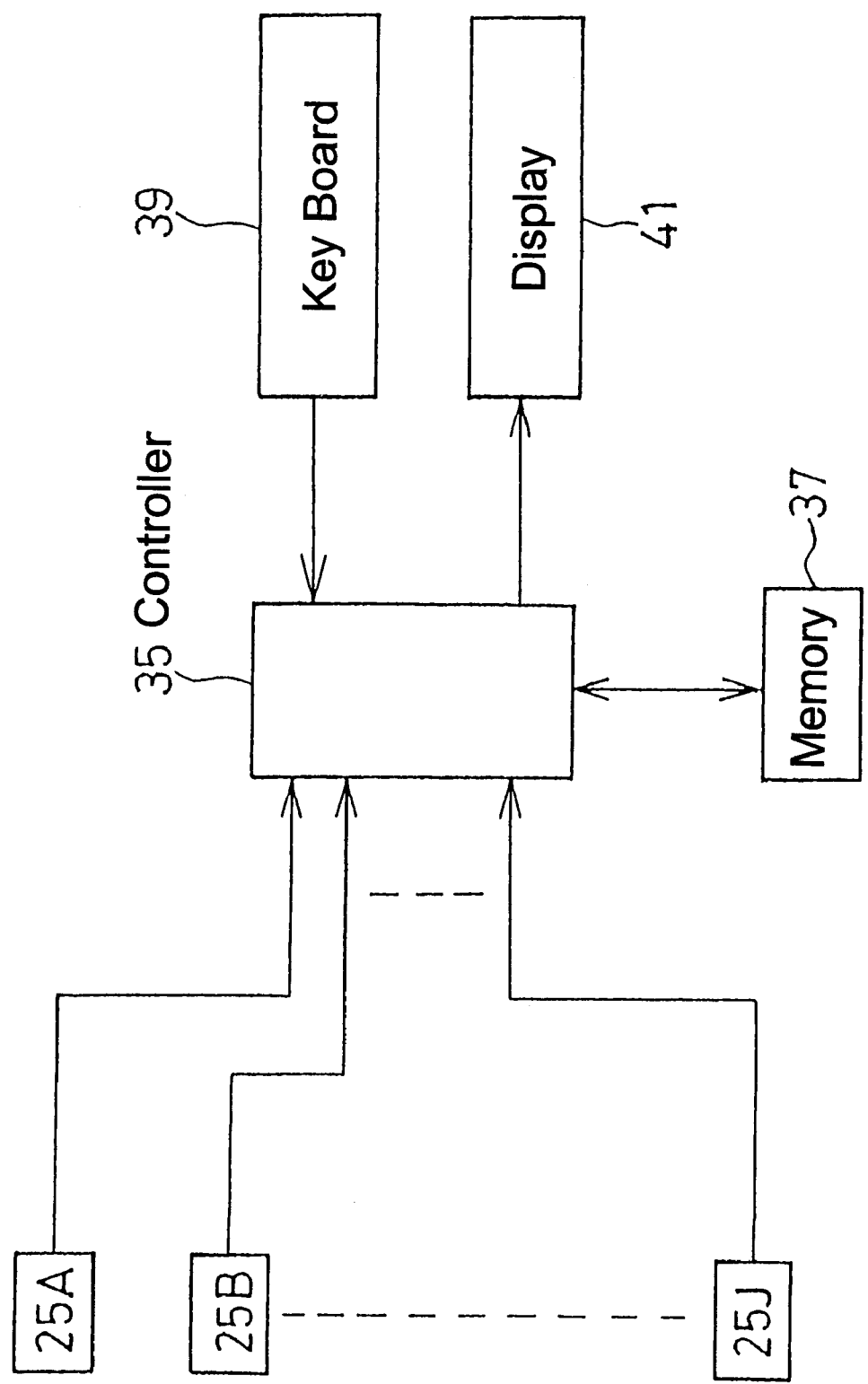
FIG. 7 is a block diagram showing the structure of monitor and control system of the oil pressure dampers 14 of the present invention.

Based on this configuration, the personal computer 36 can always monitor the detected signal from the temperature sensor 25A of the seismic oil pressure damper 14 transmitted through the communication control board 30, all the time, 24 hours a day. Thus, in the present invention, the exclusive communication network for connecting the seismic oil pressure dampers 14 and the monitor system in the conventional technology (FIG. 7) is no longer necessary. Further, the operation for monitoring the functional conditions of the seismic oil pressure damper 14 can be conducted no matter how long the distance between the seismic oil pressure damper 14 and personal computer 36 becomes. As a result, the exclusive communication network and material of the exclusive communication network as well as the work and labor for establishing the communication network involved in the conventional technology are no longer required, thereby enabling to obviate the material and labor cost.

In addition, the signals are transmitted through the public communication network such as ISDN or through a network established for a specified area such as LAN. Therefore, the signals will not be attenuated no matter how long the distance between the architectural structure 2 and architectural structure 11 becomes (even between foreign countries).

Thus, the monitor and control of the seismic oil pressure dampers 14 can be performed without regard to the distance between the seismic oil pressure dampers and the monitor and control system.

Figure 3:
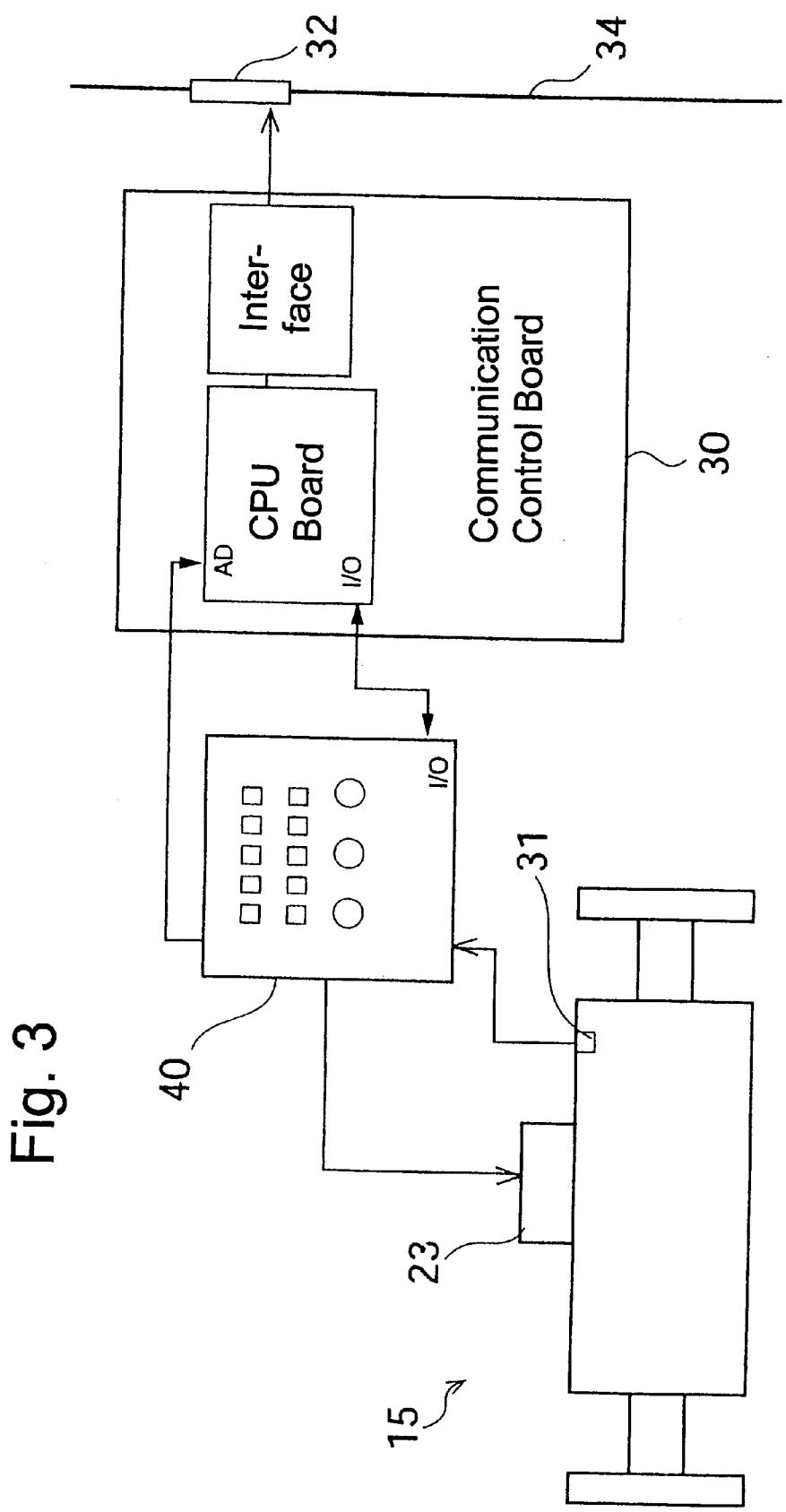
FIG. 3 is a circuit diagram showing the essential portion of the shock damper device with the monitor and control system for the architectural structure in the second embodiment of the present invention.

FIG. 3 is a drawing for explaining the second embodiment of the present invention.

A seismic oil pressure damper 15 pertaining to the second embodiment is a type of damper in which an opening diameter of a narrowed portion of the valve established en route of the oil path of a valve unit 23 is controlled. A controller 40 is provided which receives a signal from an oil pressure sensor 31 that detects the pressure in one of the oil chambers. The controller 40 sends a control signal to the valve unit 23, thereby regulating the opening diameter of the narrowed portion of the value unit 23.

When the controller 40 performs such a control function, the detected signals from the oil pressure sensor 31 to the controller 40 and the control signals from controller 40 to the valve unit 23 are transmitted to the personal computers 36 through LAN circuit 34 and public communication network 38 under the control of the communication control board 30. Therefore, the control operations of the seismic oil pressure damper 15 by the controller 40 can be monitored by the personal computer 36 in the remote location.

Figure 4:
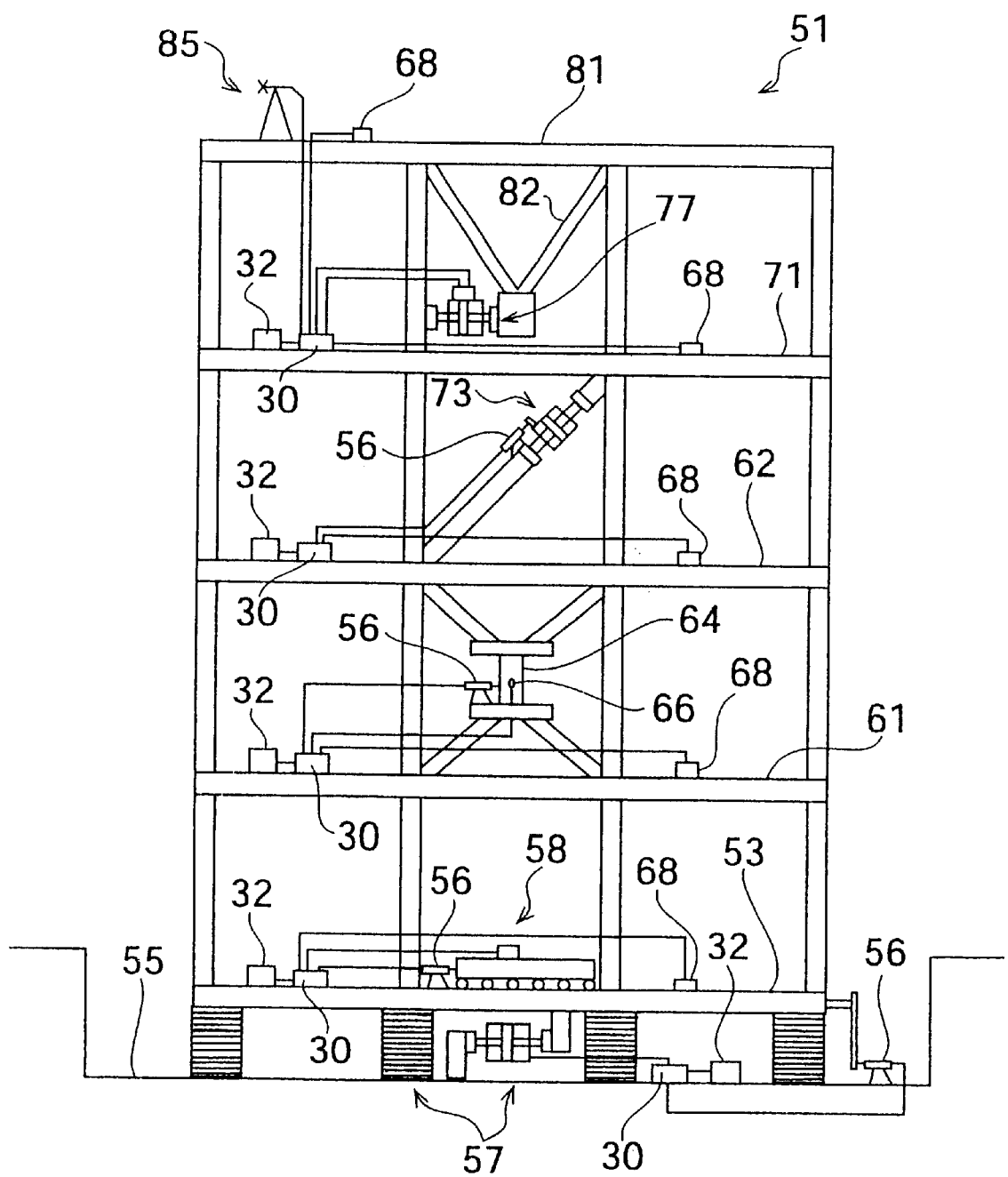
FIG. 4 is a cross sectional diagram showing an architectural structure 51 provided with various damper devices and associated devices applicable to the present invention.
Figure 5:
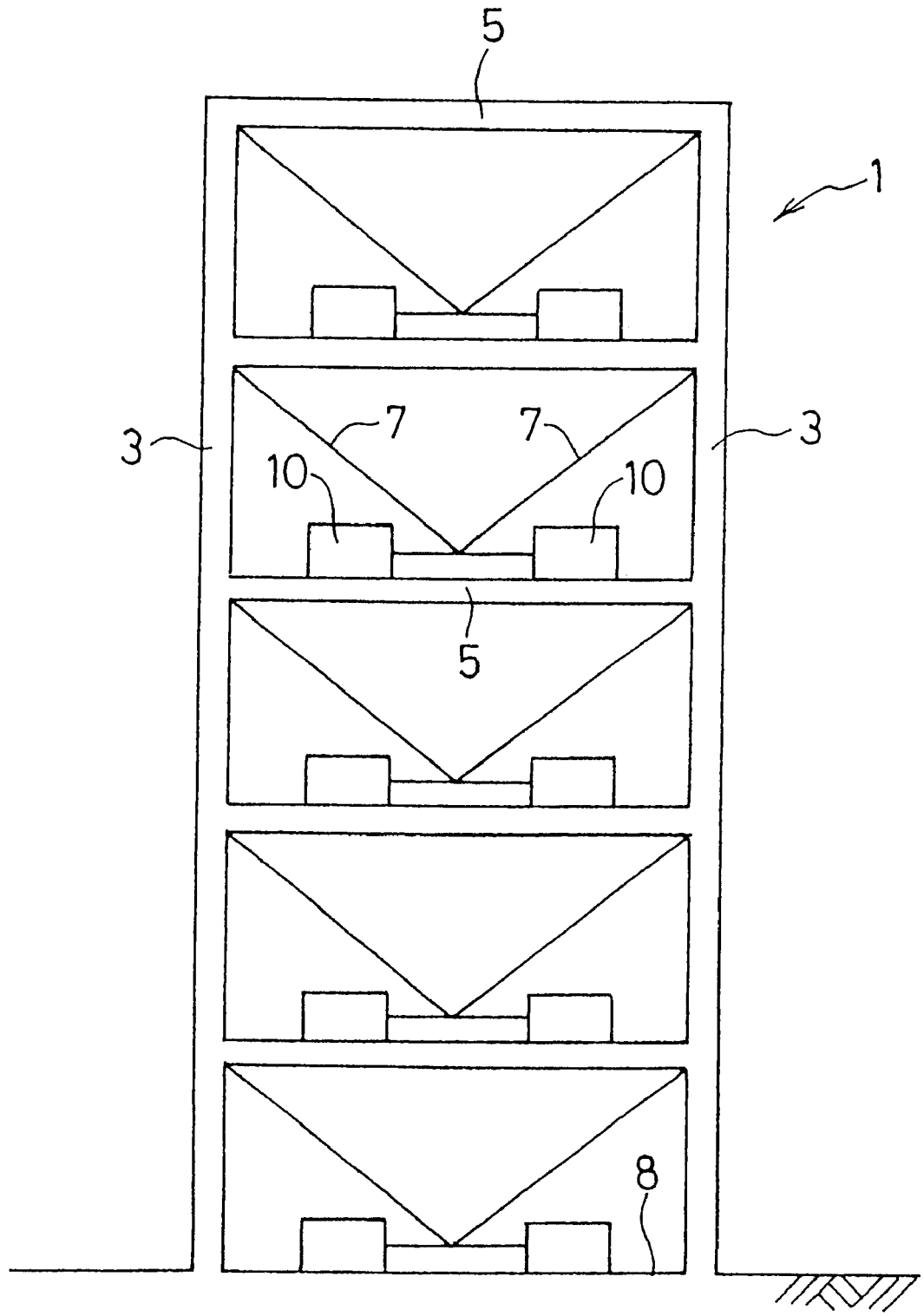
FIG. 5 is a diagram showing the configuration of architectural structure 1 provided with seismic damping structures 10 having seismic dampers.
Figure 6:
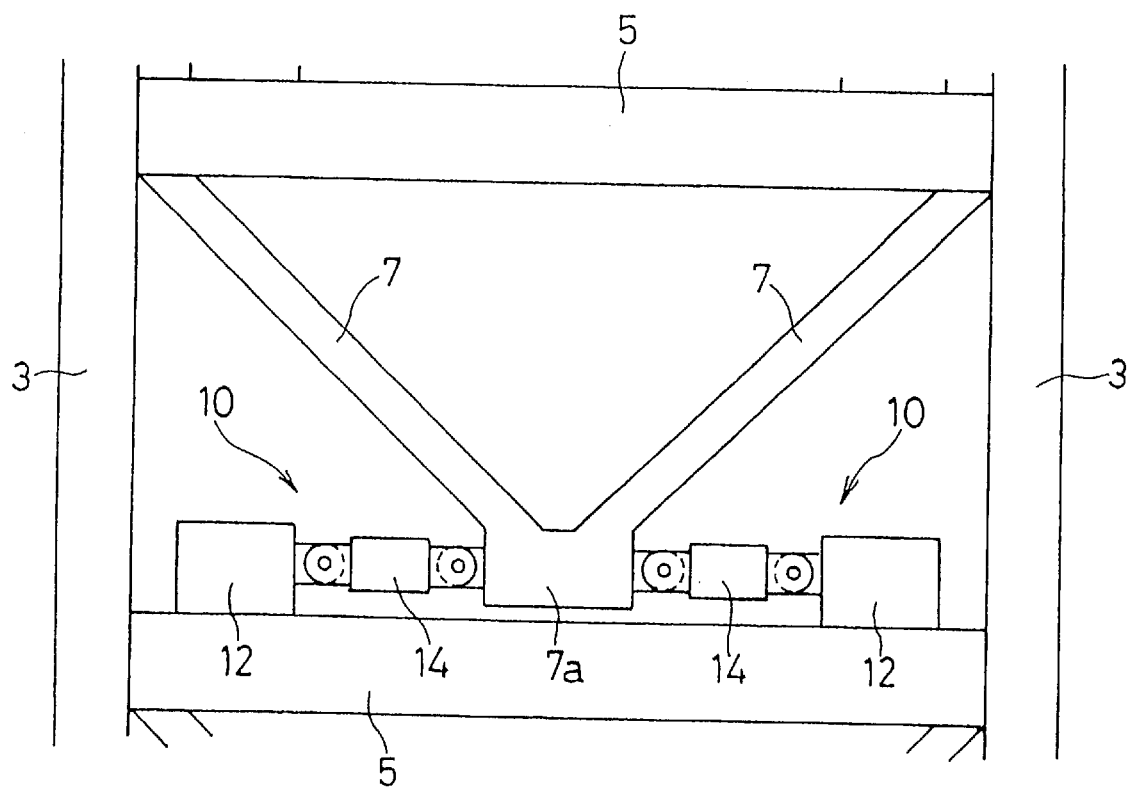
FIG. 6 is an enlarged view of an essential portion of architectural structure 1 showing the assembled structure of seismic oil pressure dampers 14.

FIG. 4 is a diagram showing an architectural structure (building) 51 which is provided with various architectural structure shock damper devices and various associated devices in accordance with the present invention. According to the building 51 in this drawing, a vibration-isolation device 57 which shuts off the vibration caused by an earthquake and a displacement gauge 56 are established between a floor 53 and a ground 55 in the first structural level of the building. Another vibration-isolation device 58 and a displacement gauge 56 are also established on the floor 53, along with an accelerometer 68 which detects the vibratory acceleration.

Between a floor 61 of the second structural level and a floor 62 of the third structural level, a shock damper device 64 which suppresses the earthquake vibration is established. A strain gauge 66 which detects the level of the distortion is installed in the shock damper device 64. Further, a displacement gauge 56 is also installed in the shock damper device 64. An accelerometer 68 is provided on the floor 61 for detecting the vibratory acceleration. An oil pressure damper 73 is established between the floor 62 of the third structural level and a floor 71 of the fourth structural level. A displacement gauge 56 is installed in an oil pressure damper device 73. An accelerometer 68 is established on the floor 62 for detecting the vibratory acceleration.

Between a V-shaped brace 82 mounted under a roof 81 and the floor 71 of the fourth structural level, an oil pressure damper device 77 is established. An accelerometer 68 is installed on the floor 71 for detecting the vibratory acceleration. Another accelerometer 68 and an anemometer 85 are provided on the roof 81 of the architectural structure 51. Each of the vibration-isolation devices 57 and 58, distortion gauge 66, oil pressure damper devices 73 and 77, anemometer 85, displacement gauges 56, and accelerometers 68 is independently connected to a hub 32 through a communication control board 30.

In the foregoing configuration of the building 1, each of the vibration-isolation devices 57 and 58, distortion gauges 66, oil pressure damper devices 73 and 77, anemometer 85, displacement gauges 56, and accelerometers 68 is able to send a signal to the personal computer 36, under the control of the communication control board 30, through the hub 32, LAN circuit 34 and ISDN circuit 38. Therefore, the personal computer 36 can monitor and control each of the vibration-isolation devices 57 and 58, distortion gauges 66, oil pressure damper devices 73 and 77, anemometer 85, displacement gauges 56, and accelerometers 68.

In the foregoing embodiment, the detected signals are derived from, for example, temperature sensor 25A of the seismic oil pressure damper 14, oil pressure sensor 31, displacement gauges 56, distortion gauge 66, accelerometers 68, and anemometer 85. However, data from sensors other than those mentioned above, such as temperature in the oil chambers, environmental temperature of the seismic oil pressure damper 14, on/off conditions of lamps operating in response to control signals supplied to the valve unit 23, changes in the amount of oil in an oil accumulator (not shown) which supplies the oil to the oil chambers of the seismic oil pressure damper 14, etc., can also be monitored and controlled by the personal computer 36.

Moreover, other than the various detected data from each of the vibration-isolation devices 57 and 58, distortion gauge 66, oil pressure damper devices 73 and 77, anemometer 85, displacement gauges 56, and accelerometers 68, it is also possible to know the situation concerning the above mentioned controller 40 in the second embodiment of the present invention. For example, any input and output signals related to the controller 40 can be monitored. Such signals include to detect whether the controller 40, such as a CPU therein, is powered, any anomaly in the signals supplied to the controller 40, and control signals sent from the controller 40 to the valve unit in the seismic oil pressure damper 15.

Furthermore, the personal computer 36 can retrieve and print out the various data over time from the past to the present recorded in the memory in the communication control board 30. Such data includes the maximum detection value and its time and date concerning the temperature of the narrowed portion of the valve unit 23, the maximum detection value and its time and date related to the piston displacement of the seismic oil pressure damper 14, the maximum detection value and its time and date in the pressure difference between the pair of oil chambers in the seismic oil pressure damper 14, and the histogram data within a specified time before and after the occurrence of the maximum detection value of the pressure difference between the oil chambers.

Traditionally, the seismic oil pressure dampers 14 have been tested on a regular basis by having someone visit the building 1 where he seismic oil pressure dampers 14 are located. According to the embodiments of the present invention, however, regular testing can be conducted from the personal computer provided in the remote location. As a result, it is necessary to have someone from the architectural structure 11 visit the remotely located architectural structure 2 to test the seismic oil pressure dampers 14 on a regular basis.

Test items in such regular testing includes open/close test of the narrowed portion of the valve unit 23 of the seismic oil pressure damper 14, and timer set/reset test to calculate the opening time of the narrowed portion and closing it after a specified time. These tests are conducted by the personal computers 36 through the public communication network 38 and the communication control board 30.

In addition, the personal computer 36 can control the controller 40 through the public communication network 38 and the communication control board 30. For example, by operating the personal computer 36, the start and stop operation of the controller 40, rewriting the control parameters in the controller 40, or changing the contents of the program for the control operation by the controller 40 can be made from the remote location. The personal computer 36 further controls the controller 40 so that the oil pressure damper 15 can be used as a passive damper device which is not directly controlled by the controller 40.

In the case where a power loss (power interruption) occurs in the building 2 or the building 11 due to an earthquake, the monitor and control of the seismic oil pressure dampers 14 by the personal computer 36 in the remote location will be suspended. However, such interruptions can be prevented by either establishing a back-up power source such as batteries in the communication control board 30 and/or controller 40, or by connecting a back-up power source to the personal computer.

Also, by having a wireless communication between the hub 32 of the LAN circuit 34 and the communication control board 30, the operational procedure of the present invention can be conducted when the connection between the hub 32 and the communication control board 30 by wire is not possible due to a specific situation of the configuration of building 2.

In the above mentioned first and second embodiments of the present invention, the seismic oil pressure dampers 14 and 15 have been explained as dampers for reducing the vibrations from an earthquake. However, the present invention can also be applied to a type of building shock damper device, such as the vibration-isolation devices 57 and 58 mentioned in the third embodiments of the present invention which shut off the vibrations and prevent the vibrations from transmitting.

Further, in the above mentioned embodiment described above, the building shock damper device utilizes relative displacements between the piston and cylinder of the seismic oil pressure damper 14 with the oil pressure cylinder for reducing the vibration. However, the present invention can also be applied to other types of damper devices such as one utilizing rubber distortions, or one involving iron beams having localized low stiffness to promote deformations.

Furthermore, in the foregoing embodiments, the relative displacement between the piston and the cylinder, the pressure, temperature, and pressure difference in the oil chambers are detected as the control data. However, other types of data such as a flow rate between the oil chambers, or a flow speed between the oil chambers can be detected as control data as well.

The embodiments of the present invention have been explained in detail, yet the present invention is not limited to the specific embodiments mentioned herein. Various changes and modifications are possible in light of the technical ideas and concepts pertaining to the present invention.

As has been described in the foregoing, according to the present invention, the detection means can detect the functional conditions of the architectural structure damper devices (shock damper devices), the communication means can send the detected signals from the detection means to the monitor and control means by using the public communication network and/or the local area network, and the monitor and control means that received the detected signals from the detection means can monitor the functional conditions of the architectural structure damper devices. Due to the configuration of the present invention, a dedicated communication network for connecting the conventional shock damper device with the monitor device is no longer needed. The operation by the monitor and control means can be conducted without regard to the distance between the shock damper devices and the monitor and control means.

What is claimed is:

1. An oil pressure damper system for damping vibration and shock applied to an architectural structure, comprising:
  a detection means for detecting a condition as to whether the oil pressure damper device in the architectural structure functions properly or not wherein the oil pressure damper device is provided for damping the vibration and shock applied to the architectural structure;
  a communication means for transmitting information on the condition of the oil pressure damper device detected by the detection means through a public communication network and/or a local area network with use of an internet function based on a computer; and
  a monitor means provided in a building at a location remote from the architectural structure having the oil pressure damper device and the detection means for receiving the information on the condition of the oil pressure damper device transmitter through the communication means and monitoring the damper device by displaying the condition as to whether the oil pressure damper device in the architectural structure function properly or not.

2. An oil pressure damper system for damping vibration and shock applied to an architectural structure as defined in claim 1, wherein said oil pressure damper device for the architectural structure is a vibration damper device for reducing vibrations.

3. An oil pressure damper system for damping vibration and shock applied to an architectural structure as defined in claim 1, wherein said oil pressure damper device for the architectural structure is an isolation damper device for isolating vibrations from transmitting to the architectural structure.

4. An oil pressure damper system for damping vibration and shock applied to an architectural structure, comprising:
  an oil pressure damper device provided in the architectural structure for damping the vibration and shock applied to the architectural structure;
  a receiver means provided in a building at a remote location from the architectural structure having the oil pressure damper device for receiving information indicating whether the oil pressure damper device for the architectural structure is normal or abnormal transmitted through a public communication network and/or a local area network with use of an internet function based on a computer;
  a monitor means provided in the building at the remote location for displaying whether the oil pressure damper device for the architectural structure is normal or abnormal based on the information from the receiver means; and
  a control means provided in the building at the remote location for controlling the oil pressure damper device in the architectural structure in terms of operation, control, repair, start and top based on the information received from the monitor means.

5. An oil pressure damper system for damping vibration and stock applied to an architectural structure as defined in claim 4, wherein said oil pressure damper device for the architectural structure is a vibration damper device for reducing vibrations.

6. An oil pressure damper system for damping vibration and stock applied to an architectural structure as defined in claim 4, wherein said oil pressure damper device for the architectural structure is an isolation damper device for isolating vibrations from transmitting to the architectural structure.

7. A monitor system for oil pressure damper devices in an architectural structure, comprising:

a detection means for detecting a condition as to whether the oil pressure damper devices in the architectural structure function properly or not wherein the oil pressure damper devices are provided for damping the vibration and shock applied to the architectural structure;

a communication means for transmitting information on the condition of the damper devices detected by the detection means through a public communication network and/or a local area network with use of an internet function based on a computer; and a monitor means provided in a building at a location remote from the architectural structure having the oil pressure damper devices and the detection means for receiving the information on the condition of the oil pressure damper devices transmitted through the communication means and monitoring the oil pressure damper devices by displaying the condition as to whether the oil pressure damper devices in the architectural structure function properly or not.

8. A control system for oil pressure damper devices in an architectural structure, comprising:

an oil pressure damper device provided in the architectural structure for damping the vibration and shock applied to the architectural structure;

a receiver means provided in a building at a remote location from the architectural structure having the oil pressure damper device for receiving information indicating whether the oil pressure damper device for the architectural structure is normal or abnormal transmitted through a public communication network and/or a local area network with use of an internet function based on a computer;

a monitor means provided in the building at the remote location for displaying whether the oil pressure damper device for the architectural structure is normal or abnormal based on the information from the receiver means; and a control means provided in the building at the remote location for controlling the oil pressure damper devices in the architectural structure in terms of operation, control, repair, start and top based on the information received from the monitor means.

* * * * *